United States Patent

Heimbigner

[15] 3,641,370

[45] Feb. 8, 1972

[54] MULTIPLE-PHASE CLOCK SIGNAL GENERATOR USING FREQUENCY-RELATED AND PHASE-SEPARATED SIGNALS

[72] Inventor: Gary Lee Heimbigner, Anaheim, Calif.

[73] Assignee: North American Rockwell Corporation

[22] Filed: June 15, 1970

[21] Appl. No.: 46,095

[52] U.S. Cl. ..............................307/269, 307/205, 307/223, 307/225, 328/17, 328/25, 328/43, 328/67

[51] Int. Cl. ..........................................................H03k 17/28

[58] Field of Search..................307/210, 220, 223, 225, 269; 328/16, 17, 25, 38, 19, 20, 43, 55, 56, 66, 67, 60, 61, 62

[56] References Cited

UNITED STATES PATENTS

| | | | |
|---|---|---|---|
| 3,551,823 | 12/1970 | Stevens | 328/55 X |
| 3,154,744 | 10/1964 | Maley | 307/220 X |
| 3,441,727 | 4/1969 | Vieth, Jr. | 328/25 X |
| 3,532,991 | 10/1970 | Winder | 307/223 X |
| 3,258,610 | 6/1966 | Balder et al. | 307/225 X |

*Primary Examiner*—Donald D. Forrer
*Assistant Examiner*—R. C. Woodbridge
*Attorney*—L. Lee Humphries, H. Fredrick Hamann and Robert G. Rogers

[57] ABSTRACT

An oscillator generates two signals having a fixed phase separation and a frequency relationship. The signals are combined for producing double- and single-width multiple-phase clock signals having a predetermined phase separation and a frequency relationship.

7 Claims, 6 Drawing Figures

INVENTOR.
GARY L. HEIMBIGNER

BY Robert G. Rogers

ATTORNEY

INVENTOR.
GARY L. HEIMBIGNER
BY Robert G. Rogers
ATTORNEY

INVENTOR.
GARY L. HEIMBIGNER

BY Robert G. Rogers
ATTORNEY

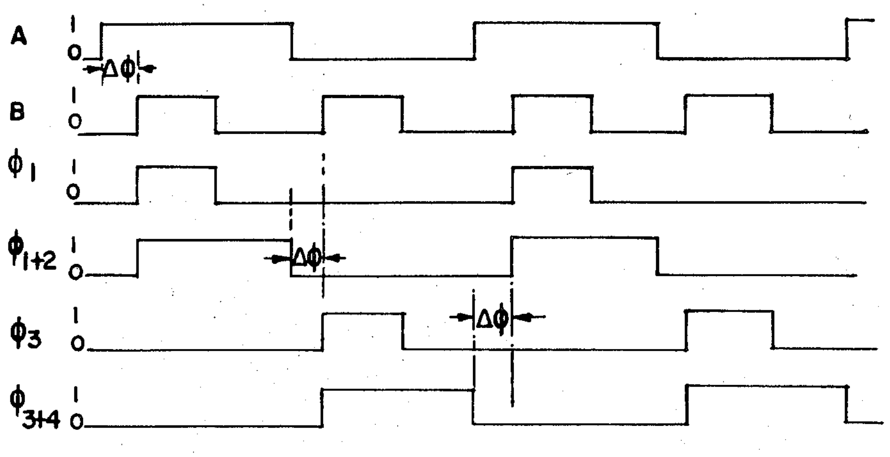
FIG. 4
TABLE I
| G | F | E | D | C | B | A |
|---|---|---|---|---|---|---|
| 0 | 1 | 0 | 1 | 1 | 0 | 1 |
| 0 | 1 | 0 | 0 | 1 | 1 | 1 |
| 0 | 1 | 1 | 0 | 1 | 1 | 1 |
| 0 | 0 | 1 | 0 | 1 | 0 | 1 |
| 1 | 0 | 1 | 0 | 1 | 0 | 1 |
| 1 | 0 | 1 | 0 | 0 | 0 | 0 |
| 1 | 0 | 1 | 1 | 0 | 1 | 0 |
| 1 | 0 | 0 | 1 | 0 | 1 | 0 |
| 1 | 1 | 0 | 1 | 0 | 0 | 0 |
| 0 | 1 | 0 | 1 | 0 | 0 | 0 |
FIG. 5
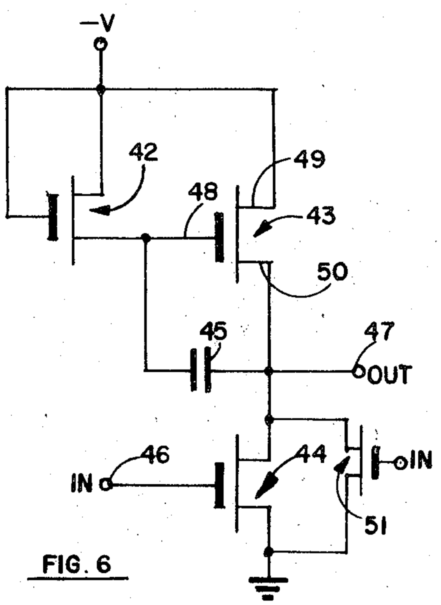
FIG. 6
*INVENTOR.*
GARY L. HEIMBIGNER
BY Robert G. Rogers
ATTORNEY

MULTIPLE-PHASE CLOCK SIGNAL GENERATOR USING FREQUENCY-RELATED AND PHASE-SEPARATED SIGNALS

BACKGROUND OF THE INVENTION

1. Field of the Invention

The invention relates to a circuit for generating multiple-phase clock signals having a predetermined frequency and predetermined phase separation and, more particularly, to such a circuit for producing said multiple phase clock signals from signals having a fixed phase separation and a fixed frequency relationship.

2. Description of Prior Art

Certain electronic systems are gated by multiple phase clock signals. For example, clock signals identified by the phase designations $\phi_1$, $\phi_2$, etc., and $\phi_{1+2}$, $\phi_{2+3}$, etc., are used in processing logical information through electronic systems fabricated on semiconductor chips. Examples of systems using multiple phase clock signals can be seen by referring to U.S. Pat. No. 3,526,783, MULTIPHASE GATE USABLE IN MULTIPLE PHASE GATING SYSTEMS, issued Sept. 1, 1970, by Robert K. Booher and U.S. Pat. No. 3,567,968, GATING SYSTEM FOR REDUCING THE EFFECTS OF NEGATIVE FEEDBACK NOISE IN MULTIPHASE GATING DEVICES, issued Mar. 2, 1971, by Robert K. Booher. One example of a multiphase clock signal generator can be seen by referring to patent application Ser. No. 787,719, MULTIPLE PHASE CLOCK SIGNAL GENERATOR, filed Dec. 30, 1968, by Gary L. Heimbigner.

The clock signals may be required to deliver relatively high power depending on the size of the electronic system. The clock signals are generated on one semiconductor chip and are conducted by leads and input pads to other semiconductor chips comprising the system. Each chip, therefore, usually requires at least four input pads and a corresponding number of leads bonded to the pads.

A clock signal generator would be preferred which would reduce the number of input pads, etc., and reduce the required clock drive power. As a result of reducing the drive power, noise problems and driver size can be reduced.

SUMMARY OF THE INVENTION

Briefly, the invention comprises a circuit for generating frequency related and phase-separated signals for use in generating single-width and double-width multiple-phase clock signals. The clock signals are frequency related and have a fixed phase separation to prevent a race condition from occurring in the circuits using the signals.

In a preferred embodiment, an oscillator comprising several inverter stages generates a signal from each oscillator stage. Certain of the signals are logically combined to produce two basic logic level signals. The logic level signals have discrete voltage levels, i.e., a positive or negative voltage, and an electrical ground voltage level. The positive or negative voltage level can be used to represent, for example, a logical one and the electrical ground voltage level can be used to represent a logical zero. An opposite convention can also be used.

The two basic signals have the required frequency relationship and the required phase separation. Ordinarily, the frequency of one signal is twice the frequency of the other signal. The phase separation is fixed as a function of the time required for all the active capacitance to be charged during a particular interval and for all the transient voltages to have decayed to a noneffective level during a particular interval. For example, if the logically true period of Signal A at one frequency is divided into five time intervals, the logically true period of the relatively higher frequency Signal B would have its leading edge occurring one time interval following the leading edge of the lower frequency Signal A. The separation can be changed as a function of the electronic delay as expected for a particular electronic system.

The basic signals, for example Signal A and Signal B, are decoded to provide both single-width and double-width clock signals. The single-width clock signals are often called minor clock signals and the double-width clock signals are often called major clock signals. All of the signals comprise multiple phase clock signals since the signals either begin or end at different times, or phases, relative to each other.

The minor clock signals may be identified as $\phi_1$, $\phi_3$ and the major clock signals identified as $\phi_{1+2}$ and $\phi_{3+4}$. Other minor clock signals such as $\phi_2$ and $\phi_4$ as well as other major clock signals such as $\phi_{2+3}$ and $\phi_{4+1}$ are not necessary for many clocking schemes. Additional decoding logic may be required to generate the additional multiple phase clock signals from the two basic signals, A and B, or from other basic signals.

The $\phi_{1+2}$ clock signal is separated from the $\phi_{3+4}$ clock signal by fixed phase interval equal to the phase interval between basic signals A and B. The $\phi_1$ clock signal is separated from the $\phi_3$ clock signal by the $\phi_2$ and $\phi_4$ time intervals and the fixed phase separation between the $\phi_{1+2}$ and $\phi_{3+4}$ clock signals.

In one application of the invention the decoder and the output drive stages for each decoder are placed on each chip of an electronic system requiring the clock signals. The A and B signal-generating circuit can be placed on one of the chips with a decode circuit for providing A and B signals to the decode logic on the other chips. As a result, instead of requiring four input pads, corresponding leads, and areas for each chip, only two are required. In addition, only the actual clock signal low capacitance need be driven on each chip. As a result, the power required and the driver size can be significantly reduced. For a fixed chip system, the leads, pads and bonds can be reduced, for example, from 31 to 16.

Therefore, it is an object of this invention to provide an improved and simplified circuit for generating four-phase clock signals having both single-width and double-width clock signals.

It is another object of this invention to provide an improved circuit for generating major and minor multiple-phase clock signals using two basic frequency related and phase-separated signals.

A still further object of this invention is to provide improved multiple-phase clocking schemes for reducing the number of input pads and area allocated to multiple-phase clock inputs on each chip of an electronic system.

A still further object of this invention is to provide an improved and simplified multiple-phase clock signal generator that enables a reduction in the size of the clock signal driver and the clock signal power.

A further object of this invention is to provide a multiple-phase clock generator in which major and minor multiple-phase clock signals can be generated from two basic signals having a fixed phase separation and having a 2:1 frequency relationship.

A still further object of this invention is to provide an improved four-phase clock generation circuit using two frequency-related and phase-separated signals produced from the output stages of an oscillator.

These and other objects of the invention will become more apparent when taken in connection with the description of the drawings, a brief description of which follows.

BRIEF DESCRIPTION OF DRAWINGS

FIG. 4 is a signal diagram showing the relationship of the A and B signals to the multiple-phase clock signals generated by the FIG. 3 decode logic.

FIG. 5 is a table showing the relationship of the true and false intervals of the various signals generated by the FIG. 1 circuit.

FIG. 6 is a schematic diagram of a field effect transistor output driver using a bootstrapping technique for providing higher output power.

DESCRIPTION OF PREFERRED EMBODIMENT

Figure 1:
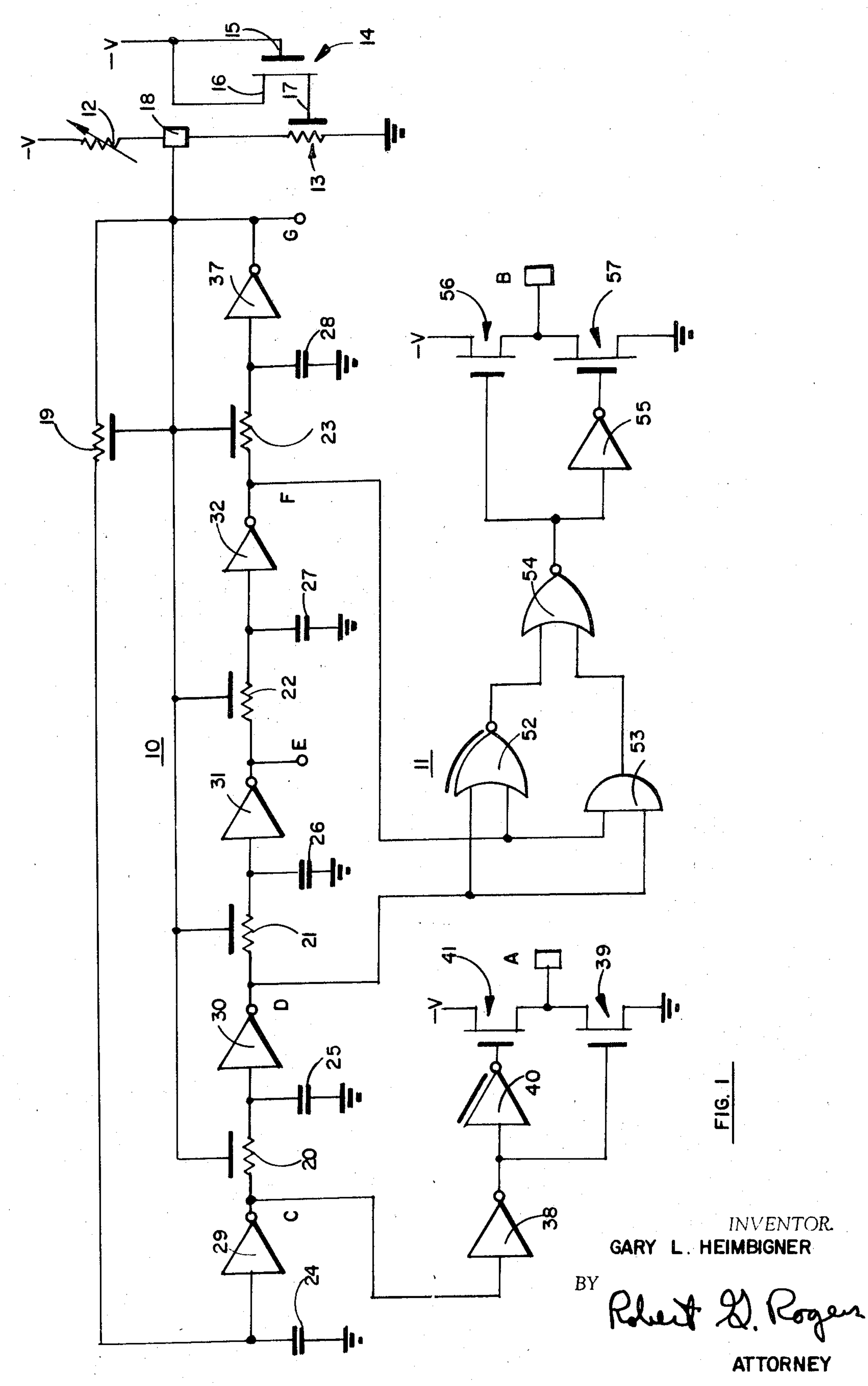
FIG. 1 is a circuit diagram of a multiple oscillator including logic for combining the outputs of certain of said stages for producing two frequency and phase-separated logic signals.

FIG. 1 is a schematic diagram of one embodiment of an oscillator 10 for generating signals at the outputs of inverter stages C through G and logic 11 for combining the signals for certain of the outputs to produce two basic frequency-related and phase-separated signals at outputs A and B. Each stage of the oscillator used a MOS device operated as a resistor and a capacitor. The MOS devices and capacitances are selected for sequentially changing the phase relationship of the signals at the outputs of each of said stages.

The input voltage, V, is divided across variable resistor 12 and MOS resistor 13. MOS device 14 also receives the input voltage V on its gate electrode 15 and drain electrode 16 to provide a voltage at gate electrode 17 of MOS resistor 13. If the voltage V tends to increase, the voltage at point 18 attempts to increase. However, since MOS resistor 13 is driven harder through MOS device 14 by the increase in V, its resistance is reduced. Therefore, even though the current through MOS resistor 13 increases due to the increase in V, the voltage at point 18 remains relatively constant because of the reduced resistance of device 13. The reverse effect occurs if the voltage V tends to decrease. Resistor 12 may be a carbon resistor with slightly negative characteristics so that as the temperature increases, its resistance does not change appreciably.

As temperature increases, the resistance of devices 19, 20, 21, 22 and 23 increases, which would tend to lower the frequency of oscillation. However, the resistance of MOS resistor 13 also increases causing the voltage at 18 to become more negative driving MOS devices 19 through 23 harder, which tends to return them to their original resistance value thereby maintaining the original frequency of oscillation.

The voltage at point 18 keeps MOS devices 19 through 23 turned on and, therefore, determines the resistance of the RC time constants for each of the inverter stages C through G. Capacitors 24 through 28 comprise the capacitors for each stage C through G, respectively. The stages C through G also include inverters 29 through 33, respectively, for inverting the voltage appearing across each of the capacitors. Inverters are well known in the art. For example, two series connected field effect transistors can be used as an inverter.

By way of explanation, it is pointed out that the voltage at point 18 is inverted five times as it is passed through the stages of the oscillator 10. Therefore, at point G, the voltage is inverted, or 180° out of phase with the voltage appearing at point 18. As a result, the input to point C changes causing the circuit to continue its oscillation.

The signal at output A is produced directly from the signal at the output of stage C of oscillator 10. The output from stage C is inverted by inverter 38 and used to drive MOS device 39 alternately in and out of conduction. Inverter 40, including a bootstrap output driver, provides the drive signal for MOS device 41.

The symbol used for inverter 40 comprising the slanted line above the inverter designation is used to indicate the presence of a bootstrap driver. One example of a bootstrap driver can be seen by referring to FIG. 6.

MOS devices 42, 43 and 44 including feedback capacitor 45 illustrate an inverter such as inverter 40 having a bootstrap driver output. The term "bootstrap" refers to the feedback capacitor 45 between the source electrode and gate electrode of MOS device 43.

In operation, an input signal is received at terminal 46 and MOS device 44 is turned on. As a result, the output at terminal 47 is connected to ground. MOS device 42 is held on since its gate electrode and drain electrode are both connected to V. Therefore, when output 47 is tied to ground, capacitor 45 is charged approximately to V. MOS device 43 is also held on during that period.

When input 46 is false, MOS device 44 is turned off. The voltage at the output 47 is fed back to the gate electrode 48 of MOS device 43. As a result, the voltage on the gate electrode is substantially increased and the conduction of MOS device 43 is enhanced as a function of the voltage increase at the gate electrode 48. Since the gate electrode voltage for at least a threshold drop greater than the voltage at the drain electrode 49 of MOS device 43, the source electrode 50 and the output 47 are driven to V. Therefore, by using feedback capacitor 45, a higher output and, therefore, higher power, can be delivered at an output.

MOS device 51 is shown in FIG. 6 to illustrate an example of a NOR gate with a bootstrap driver output stage. NOR-gate 52, comprising part of logic 11, is an example of a NOR gate which used a bootstrap output driver for increasing the power and voltage at its output.

It should be obvious from the preceding description that the signal at output A is substantially identical to the signal at the output of stage C, since the output from stage C is inverted twice. That relationship is further illustrated in FIG. 5 by the table. As indicated, the true interval of Signal A is identical to the true interval of Signal C. The same relationship also appears for the false interval designated by the zeros. For purposes of describing the system, the true interval is divided into five time periods and the false interval is divided into a like number of time periods.

The signal at output B is produced by combining the outputs from stage D and stage F. The signal is defined logically by the following equation:

$$B=\overline{D}F+D\overline{F}=D\oplus F \quad (1)$$

In other words, the signal at B is the exclusive OR of the $D$ and $F$ outputs. That relationship can also be seen by referring to the FIG. 5 table. $B$ is true for two periods and false for three periods. When $B$ is true, $F$ is true but $D$ is false, or $D$ is true and $F$ is false. At all other times, $B$ is false.

The outputs from stages $D$ and $F$ are Nor'd by Nor-gate 52 which has a bootstrap output stage as described in connection with FIG. 6. The $D$ and $F$ stage outputs are also AND'd together by AND-gate 53. The outputs from gates 52 and 53 are NOR'd by NOR-gate 54 and provided as an input to inverter 55 and MOS device 56. The output from inverter 55 provides a drive signal for transistor 57.

The output from NOR-gate 54 is true, when the logic equation indicated above is satisfied. When the output is true, transistor 56 is turned on and a signal level approximately equal to V appears at output $B$. The true output is inverted through inverter 55 to hold transistor 57 off.

For purposes of describing one embodiment, P-type field effect devices may be used. In that case, negative voltages would be used. A negative voltage would represent a logic one, and electrical ground indicates a logic zero. In other embodiments, N-type devices may be used with positive voltages and a different logical convention may be selected.

Figure 2:
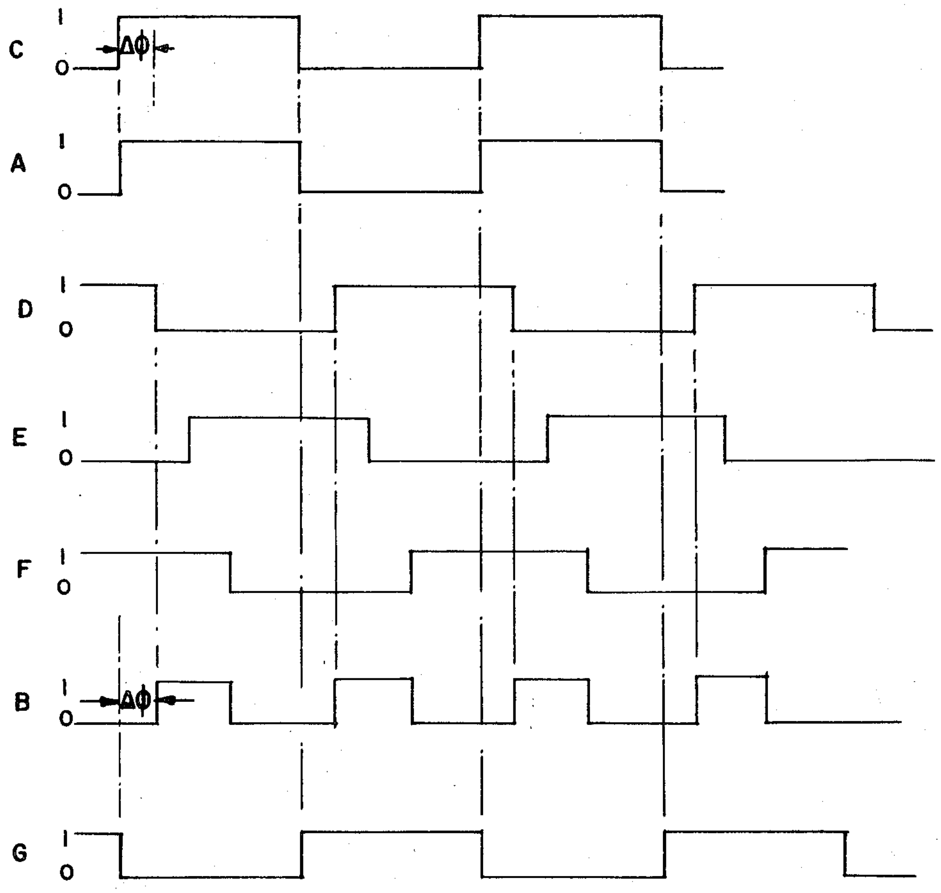
FIG. 2 is a signal diagram of the signals from the stages of the FIG. 1 circuit and the A and B signals at the outputs from the FIG. 1 circuit.

FIG. 2 is a wave diagram showing the relationship of signals at the outputs from stages C through G as well as the relationship of the inverter output signals to the signals at output terminals A and B. As indicated by the signal diagram, the A and C signals are equal. The $D$ signal becomes false one time period after the C signal goes true. The E signal goes false one time period after the $D$ signal goes true. The $F$ signal goes false one time period after the E signal goes true, and the G signal goes false one time period after the $F$ signal becomes true. The $D$ signal becomes true each time either $F$ or $D$ is true when the other is false. As a result, the $B$ signal goes true one time period, designated $\Delta\phi$ herein, after the A signal goes true, and one time period, $\Delta\phi$, after the A signal goes false. Therefore, the $B$ signal leading edge is separated from both the leading and trailing edges of the A signal by a time interval designated $\Delta\phi$. In addition, it can be seen that the $B$ signal has a frequency which is twice the frequency of the A signal. Therefore, the signals have a fixed phase separation, i.e., $\Delta\phi$, and a fixed frequency relationship, i.e., Signal *B* is twice the frequency of Signal A.

Figure 3:
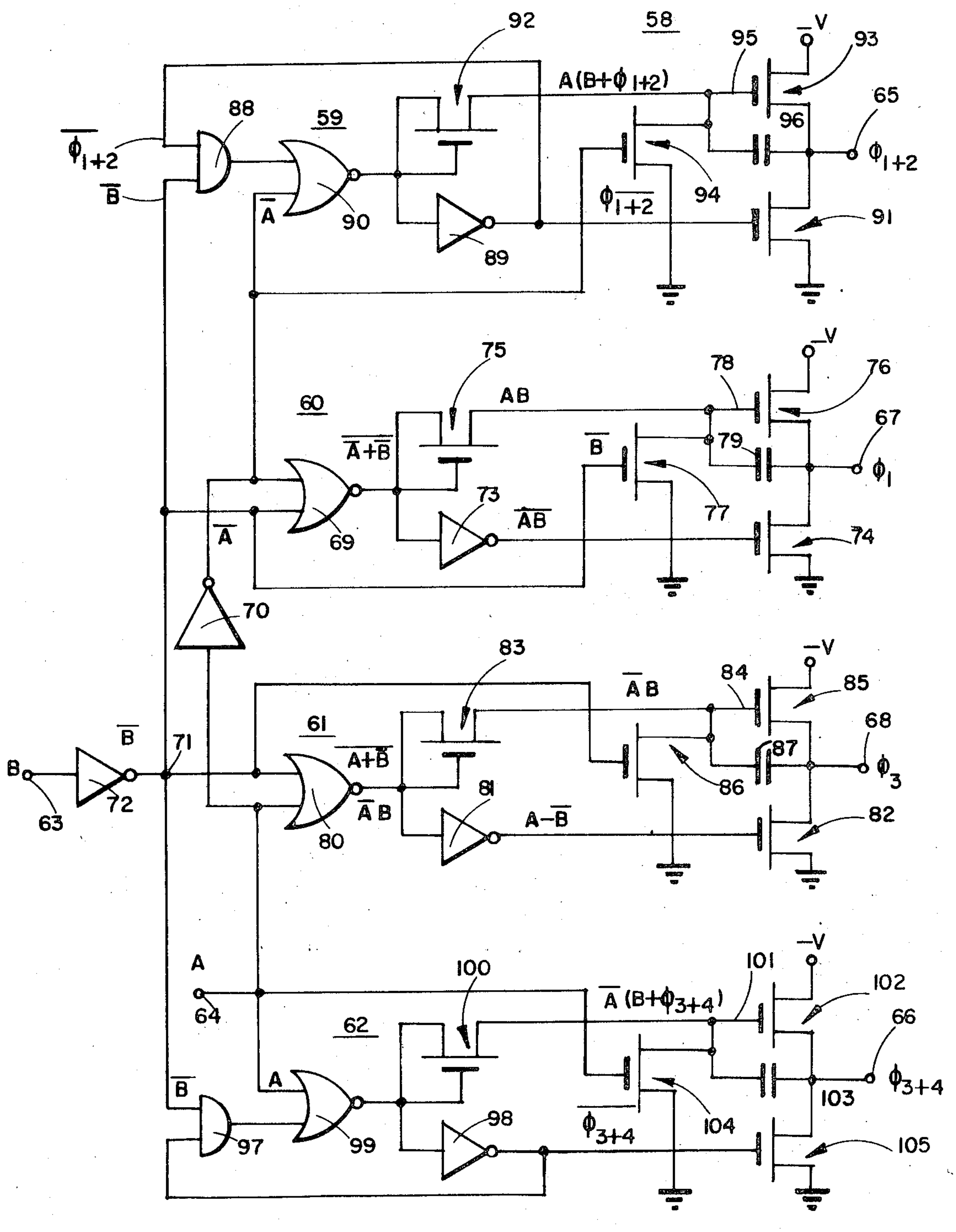
FIG. 3 is a logic diagram of one embodiment of decode logic used for decoding the A and B signals into four multiple-phase clock signals.

FIG. 3 is a logic diagram of decode logic 58 including channels 59, 60, 61 and 62 for generating the multiphase signals $\phi_{1+2}\phi_1$, $\phi_{3\ 3}$, and $\phi_{3+4}$, respectively, from the input signals from outputs A and B of the FIG. 1 circuit. The A and B inputs to FIG. 3 are identified by the terminals 63 and 64.

The output terminals for the major (double-width) multiple-phase clock signals $\phi_{1+2}$ and $\phi_{3+4}$ are 65 and 66, respectively. The output terminals for the minor (single-width) multiple-phase clock signal $\phi_1$ and $\phi_3$ are 67 and 68, respectively. The FIG. 3 circuitry satisfies the following logic equations:

$$\phi_1=AB, \quad (2)$$

$$\phi_{1+2}=A(B+\phi_{1+2}), \quad (3)$$

$$F3x\bar{A}B, \quad (4)$$

$$F3_{+4}=\bar{A}(B+\phi_{3+4}) \quad (5)$$

Channel 60 comprises NOR-gate 69 which receives inputs from inverter 70 and terminal 71. Terminal 71 receives an input from inverter 72. The signal at terminal 71 is $\bar{B}$, and the output from inverter 70 is $\bar{A}$. The output from NOR-gate 69 is *AB*.

Inverter 73 inverts the *AB* output from NOR-gate 69 to provide an $\overline{AB}$ output as a drive signal to MOS device 74. MOS device 75 is held on by the *AB* output from NOR-gate 69 to provide a drive signal for MOS device 76. When either *A* or *B* are false, MOS device 75 isolates the MOS device 76 from the NOR-gate 69.

MOS device 77 receives a $\bar{B}$ drive signal from the output of inverter 72 and clamps transistor 76 off during such time that the *AB* output from NOR-gate 69 is false. In addition, when MOS device 77 is turned on, the gate electrode 78 of MOS device 76 is connected to ground for discharging the charge stored during the time MOS device 75 is turned on. The driver for the multiple-phase clock signal, $\phi_1$, comprises MOS devices 74, 76 and feedback capacitor 79. The driver is, therefore, a bootstrap driver as previously described in connection with FIG. 6.

It is pointed out that while MOS devices are described in the preferred embodiment, other field effect devices (P- and N-type) can be used within the scope of the invention.

Channel 61 is substantially identical to channel 60. NOR-gate 80 receives input signals $\bar{B}$ and *A*. The output from NOR-gate 80 is $\overline{A+B}$, which is the same as $\bar{A}B$. Inverter 81 inverts the output from NOR-gate 80 to provide a drive signal for MOS device 82. MOS device 82 sets the output 68 to ground when *A* is true and *B* is false.

Isolation MOS device 83 is turned on when the output of NOR-gate 80 is true, i.e., $\bar{A}B$, to provide a drive signal at the gate electrode 84 of MOS device 85. MOS device 86 clamps the gate electrode 84 to ground when $\bar{B}$ is true. Therefore, after *B* has been true, $\bar{B}$ becomes true to discharge the charge stored at the gate electrode of MOS device 85. The output driver for multiple-phase clock signal $\phi_3$ comprises MOS devices 82, 85, and feedback capacitor 87.

Since both channels 60 and 61, as well as the other channels 59 and 62, use a bootstrapped output driver, the voltage levels appearing at terminals 65 through 68 are approximately equal to V. For the particular embodiment being described, V represents a logic one.

The clock signals $\phi_1$ and $\phi_3$ at terminals 67 and 68 are minor multiple-phase clock signals since the clock signals have true and false periods which are one-half the true and false periods of the major multiple-phase clock signals $\phi_{1+2}$ and $\phi_{3+4}$.

Channel 59 for generating major multiple phase clock signal $\phi'_{+2}$ comprises AND-gate 88 which receives a $\bar{B}$ input from the output of inverter 72 and an output from inverter 89. NOR-gate 90 receives an input from AND-gate 88 and $\bar{A}$ input from inverter 70. The output from inverter 89 is $\overline{\phi_{1+2}}$. In other words, inverter 89 provides a drive signal for MOS device 91. When MOS device 91 is turned on, the output from terminal 65 is the false logic level of $\phi_{1+2}$. Therefore, the output from NOR-gate 90 is $A(\phi_{1+2}+B)$.

When the output from NOR-gate 90 is true, isolation MOS device 92 is turned on to provide a drive signal for MOS device 93. Clamping MOS device 94 is turned on when $\bar{A}$ is true for discharging the charge stored at the gate electrode 95 of MOS device 93 to electrical ground. Capacitor 96 between the gate electrode 95 and the drain electrode of MOS device 93 enables the output driver comprising MOS device 93 and MOS device 91 to operate as a bootstrap output driver.

Channel 62 is substantially the same as channel 59 except that different signals are combined to generate the major multiple-phase clock signal $\phi_{3+4}$ at terminal 66. The channel comprises AND-gate 97 which receives a $\bar{B}$ input from inverter 72 and a $\overline{\phi_{3+4}}$ input from inverter 98. NOR-gate 99 provides an output of $\bar{A}(B+\phi_{3+4})$. When the output NOR-gate 99 is true, isolation MOS device 100 is turned on to provide a drive signal at the gate electrode 101 of MOS device 102. Capacitor 103 provides feedback from the output 66 to the gate electrode 101. MOS device 104 is turned on by the *A* signal for resetting gate electrode 101 to ground. MOS device 105 is turned on by the $\overline{\phi_{3+4}}$ signal for setting output terminal 66 to electrical ground, which is equivalent to setting $\phi_{3+4}$ false.

FIG. 4 is a signal diagram of the output signals from the FIG. 3 decode logic generated by combining Signals *A* and *B* through the channels 59 through 62. As indicated in FIG. 4, the $\phi_1$ signal becomes true when both *A* and *B* are true. Therefore, $\phi_1$ has a frequency equal to the frequency of the *A* signal.

Clock signal $\phi_{1+2}$ becomes true when *A* and *B* are true and remains true until *A* goes false. $\phi_3$ is true when *B* is true and *A* is false. Since *A* and *B* are separated by $\Delta\phi$, $\phi_3$ and $\phi_{1+2}$ are also separated by $\Delta\phi$.

$\phi_{3+4}$ becomes true when *B* is true and *A* is false. $\phi_{3+4}$ remains true until *A* becomes true. $\phi_{3+4}$ and $\phi_{1+2}$ are also separated by $\Delta\phi$.

It should be obvious that $\phi_{1+2}$ and $\phi_{3+4}$ are equal in frequency, although both are separated by a fixed phase, $\Delta\phi$. Similarly, $\phi_1$ and $\phi_3$ are equal in frequency, although separated by a time interval equal to $\Delta\phi$ and one clock signal phase, for example $\phi_2$. Therefore, the multiple-phase clock signals are related in frequency and separated by a fixed phase.

It is pointed out that the clock signal $\phi_{1+2}$ may be generally described as $\phi_{a+b}$ and that clock signal $\phi_{3+4}$ may be generally described as $\phi_{c+d}$. Similarly, $\phi_1$ could be designated $\phi_a$ and $\phi_3$ designated as $\phi_c$.

Although the preferred embodiment uses an oscillator circuit to generate the two basic frequency related and phase separated signals, it should be obvious that other circuits and means may be used to produce the two signals. For example, a one-shot multiple-phase vibrator followed by a delay circuit could be used to produce the *A* and *B* signals. In addition, a computer program could be utilized in generating the two signals.

I claim:

1. A circuit for generating double- and single-width multiple-phase clock signals, said circuit comprising,
   - means for generating a plurality of symmetrical and phase-separated signals having the same frequency,
   - first logic gating means responsive to at least one of said signals for generating a first signal,
   - second logic gating means responsive to at least two of said signals for generating a second signal, the frequency of said second signal being an even multiple of the frequency of said first signal, said second signal being displaced in phase from said first signal by an amount equal to the phase separation between said symmetrical signals, and
   - third logic gating means responsive to said first and second signals for generating a first plurality of double-width multiple-phase clock signals and a first plurality of single-width multiple-phase clock signals, said double-width clock signals being separated in phase equal to the phase separation between said first and second signals, said multiple-phase clock signals having the same frequency.

2. A circuit for generating double- and single-width multiple-phase clock signals, said circuit comprising, oscillator means comprising a plurality of inverter stages each providing an output signal, and logic gates combining outputs from selected inverter stages for generating at lease two signals, one of which having a frequency of two times the other, and said signals having a preselected phase separation, means for logically combining said signals for producing a first plurality of double-width multiple-phase clock signals and a first plurality of single-width multiple-phase clock signals, said double-width multiple-phase clock signals having a phase separation equal to said preselected phase separation of the signals generated by said logic gates, said double-width and single-width multiple-phase clock signals having a predetermined frequency relationship relative to each other.

3. The circuits recited in claim 2 wherein said means for logically combining comprises decode logic for generating two double-width multiple-phase clock signals and two single-width multiple-phase clock signals.

4. The circuit recited in claim 2 wherein each state of said oscillator includes a RC time constant with each resistor comprising a field effect transistor, input voltage means and voltage adjust means for varying the frequency of oscillation of said oscillator means, and field effect transistor means for compensating for variations in said voltage and temperature.

5. The circuit recited in claim 3 wherein said two double-width multiple clock signals are generated in accordance with the following equations:

$\phi_{a+2}=\underline{A}(B=\phi_{a+b})$, $\phi_{c+d}=\bar{A}(B=\phi_{c+d})$ and said single-width multiple-phase clock signals are generated in accordance with the following equations:

$\phi_a=\underline{A}B$, $\phi_c=\bar{A}B$, where $A$ an $B$ are two signals generated by said oscillator means and said $a, b, c, d$ represent phase of said multiple-phase clock signals.

6. The circuit recited in claim 2 wherein said oscillator means comprises an unequal number of inverter stages with the feedback from the last stage comprising an input to the first stage for sustaining oscillation.

7. A circuit for generating double- and single-width multiple-phase clock signals having the same frequency but separated in phase, said circuit comprising, signal generator means having a plurality of stages each providing symmetrical output signals equal in frequency but displaced from each other by a phase interval, logic gating means for selectively combining signals from said outputs for producing signal A and signal B, signal B having twice the frequency of signal A and being separated in phase from signal A by the amount of the phase separation between the output signals provided by said generator means, means for logically combining signal A and signal B for producing a first plurality of double-width multiple-phase clock signals and a first plurality of single-width multiple-phase clock signals, said double-width and single-width multiple-phase clock signals having the same frequency and being separated in phase from each other by the amount of the phase separation between signal $A$ and signal $B$.

* * * * *